R. J. NOAKES.
PIPE COUPLING.
APPLICATION FILED DEC. 13, 1917.
1,273,174.
Patented July 23, 1918.
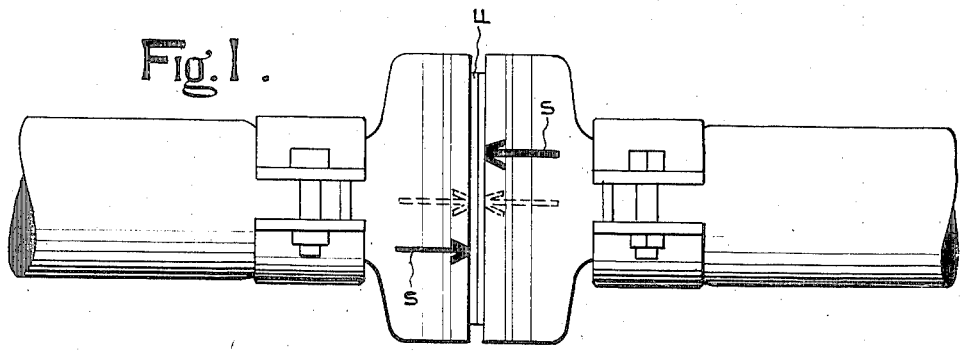
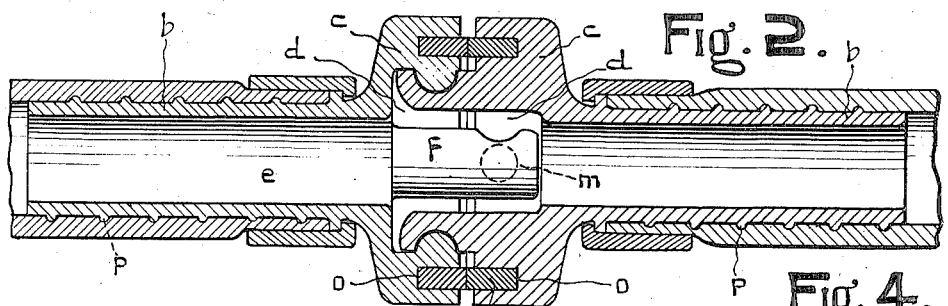
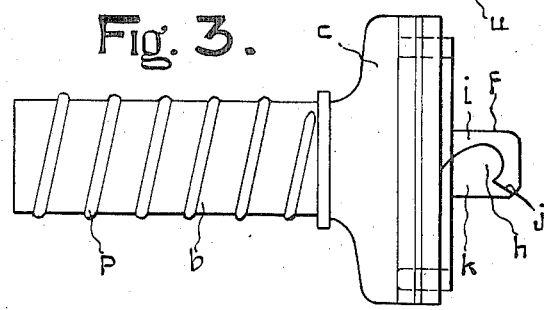
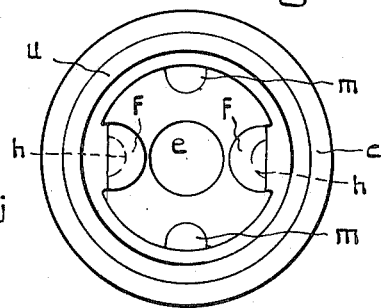
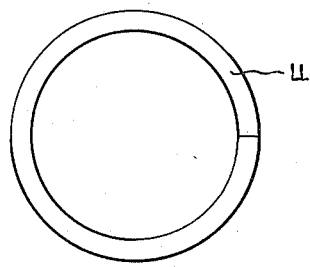
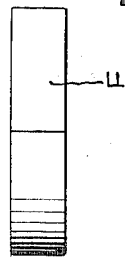
Witness:
Gordon R. Cooke
Robert J. Noakes
Inventor
per Attorney
William R. McFeat

UNITED STATES PATENT OFFICE.

ROBERT J. NOAKES, OF MONTREAL, QUEBEC, CANADA, ASSIGNOR OF ONE-HALF TO GEORGE JAMES SHEPPARD, OF MONTREAL, CANADA.

PIPE-COUPLING.

1,273,174.  Specification of Letters Patent.  Patented July 23, 1918.

Application filed December 13, 1917. Serial No. 207,013.

*To all whom it may concern:*

Be it known that I, ROBERT JAMES NOAKES, mechanical superintendent, of the city of Montreal, in the district of Montreal, Province of Quebec, Dominion of Canada, have invented certain new and useful Improvements in Pipe-Couplings; and I do hereby declare that the following is a full, clear, and exact description thereof.

My invention relates particularly to pipe couplings of the type requiring to be coupled and uncoupled with despatch, and has for its object to provide a device of this nature the members of which will be firmly interlocked and present the perfectly tight joint and at the same time also present an exterior without protuberances and of relatively large diameter to facilitate manipulation; while the interior presents no obstruction to the clear and invariable passage of the fluid conducted.

To this end the invention may be said to consist essentially of a pair of coupling members corresponding with one another in all respects and consequently being interchangeable. Each of these members comprises a head and a shank, the head being of relatively large diameter and being chambered to accommodate within it and outside of the diameter of the bore, a pair of lugs located at diametrically opposite sides of the bore, while each outer face has a locking and clamping socket adapted to engage teats also located at diametrically opposite sides of the chamber and in a plane at right-angles to the plane in which the lugs are located. The lugs of each head are adapted to engage the teats of the other head. The faces of these heads are each provided with a concentric circular gasket; while the exterior of each shank is formed with a spiral thread to facilitate the connection of the hose or other flexible conductor the ends of which are to be united by this coupling.

For full comprehension, however, of my invention, reference must be had to the accompanying drawings in which similar reference characters indicate the same parts, and wherein:

Figure 1 is a side elevation of my improved coupling with the members brought together ready to be locked.

Fig. 2 is a longitudinal view of the coupler members locked together.

Fig. 3 is a side elevation of one of the coupler members.

Fig. 4 is an end view of one of the coupling heads.

Figs. 5 and 6 are detail views of the gasket for packing the joint between the heads when coupled.

The coupling members, as before mentioned, correspond in all respects, and it will be necessary for me to describe one only in detail. Each member consists of a shank, $b$, and an integral head, $c$, the shank being of tubular form and merging into the head which is chambered as at $d$, to an interior diameter sufficiently greater than the bore, $e$, of the shank to accommodate outside of the circumferential line of the bore, a pair of lugs, $f$. The outer face, of each lug is finished in an arc coincident with the circumferential line of the chamber the inner sides thereof being formed to curve of relatively small diameter in order to give body to the lug. The outer face of each lug is formed with a socket, $h$, closed at one side by a wall, $i$, formed by one side of the lug, while the opposite side is cut away to present an inclined face, $j$, and an opening $k$. These lugs of each member are, by the structure just described, adapted to engage a pair of teats, $m$, protruding inwardly from the wall of the chamber at diametrically opposite sides thereof and in a plane at right-angles to the plane in which the lugs are disposed.

In order to provide a tight joint between these coupling members when coupled, and at the same time afford a relatively large diameter to facilitate the manipulation of the coupling members, the face of each is of sufficient width to accommodate a concentric groove, o, in which is seated a gasket u of rubber or other suitable packing material. This arrangement of the gasket places it outside of the lugs and teats and consequently away from the passage of the fluid conducted by the pipes my improved coupling is designed to unite.

The exterior of the shank of each coupling member is cast or otherwise formed with the spiral thread, p. Each head has marked thereon an arrow s, to indicate the proper relative positions the heads must assume before being locked.

*Operation.*

When it is desired to couple flexible pipe lengths with my invention, the coupling members are screwed into the respective pipe ends to be coupled, the spiral thread facilitating this action and permitting the members to be readily united to almost any pipe of soft or relatively soft material, such as ordinary rubber piping and the wire-wound kind. The respective heads are then brought into juxtaposition with the arrows in line as shown in dotted lines Fig. 1, thus placing each lug with the opening k, in juxtaposition with the teat it is to engage. When in this position the heads are rotated in opposite directions thereby causing the teats to engage the inclined surfaces thus drawing the heads together and compressing the gasket until the juxtaposed faces of the heads almost come into bearing relation; and the teats reach the sockets h, where they are yieldingly held by the expansion of the gasket, the latter, however, being held under tight compression, and in this manner a perfect joint is effected between the gasket and consequently between the coupling members while the latter are yieldingly locked in coupled position.

This improved coupling has many advantages over other pipe couplings heretofore used in that the coupling heads are interchangeable and consequently the disadvantage of two rights or two lefts being brought together is avoided. Many different diameters of shank can be used with what may be a standard head. A perfectly tight joint is presented for compressed air, steam, or other fluid conducting pipes or where any other connection or joint pipes are used, the passage through the coupling being packed by a gasket of relatively large diameter and outside of the locking lugs cannot be obstructed by displacement of the gasket, and this passage is consequently in no danger of being blocked or obstructed. The gasket cannot be displaced by the fluid when projected through one of the uncoupled heads, the position of the gasket in the abutting faces of the heads and supported at a both inside and outside diameter by the walls of the grooves in which they are set securing maximum efficiency as a joint packing, the lugs and the teats with which they interlock being within the heads any danger of damage to them is obviated and the relatively large diameter and knurled exterior of the heads facilitates manipulation and makes the use of a tool for opening and closing the coupling quite unnecessary. Another and important advantage is that the coupling members are not only locked together against accidental disconnection, but are clamped in their locked position owing to the fact that each socket holds its teat within the extreme opening presented by the inclined planes, j.

What I claim is as follows:—

1. A hose or pipe coupling comprising a pair of members each consisting of an integral head and shank axially bored throughout their length, each head being of relatively large diameter, lugs and teats formed integrally with said head, the lugs having their outer faces coinciding with the wall of the chamber and having sockets each with an opening at one side to receive the teats of the other member, the diameter of the space between the lugs being greater than the diameter of the bore of the shank of each member; the face of each member having a concentric groove and a gasket seated therein.

2. A coupling for flexible pipes comprising a pair of members each consisting of a unitary integral head and shank axially bored throughout their length, each head being of relatively large diameter and having its bore of increased diameter to present a chamber, a pair of lugs formed integrally with each head and located at diametrically opposite points and a pair of teats formed integrally with each head and diametrically oppositely disposed in a plane at right-angles to the plane in which the lugs are located, the lugs having their outer faces coinciding with the wall of the chamber and having sockets each with an opening at one side to receive the teats of the other member, the diameter of the space between the lugs being greater than the diameter of the bore of the shank; the face of each member having a concentric groove and a gasket seated therein.

3. A coupling for flexible pipes comprising a pair of members each consisting of an integral head and shank axially bored throughout their length, each head being of relatively large diameter and having its bore of increased diameter to present a chamber, lugs and teats formed integrally with the said head, the lugs having their outer faces co-inciding with the wall of the chamber and having sockets each with an opening at one side to receive the teats of the other member, the diameter of the space between the lugs being greater than the diameter of the bore of the shank of each member, the edge of the said side opening into the socket in each lug being inclined; the face of each member having a concentric groove and a gasket seated therein.

In testimony whereof I have signed my name to this specification in the presence of two witnesses.

ROBERT J. NOAKES.

Witnesses:
 GORDON G. COOKE,
 WILLIAM J. C. HEWETSON.